(12) United States Patent
Huang

(10) Patent No.: US 7,047,598 B2
(45) Date of Patent: May 23, 2006

(54) PIVOTAL DEVICE

(75) Inventor: Tien-An Huang, Taipei (TW)

(73) Assignee: ASUSTek Computer Inc., Taipei (TW)

(*) Notice: Subject to any disclaimer, the term of this patent is extended or adjusted under 35 U.S.C. 154(b) by 0 days.

(21) Appl. No.: 10/969,839

(22) Filed: Oct. 22, 2004

(65) Prior Publication Data
US 2005/0102799 A1    May 19, 2005

(30) Foreign Application Priority Data
Nov. 14, 2003    (TW) .............................. 92132090 A

(51) Int. Cl.
*E05D 3/10* (2006.01)

(52) U.S. Cl. ..................... 16/312; 16/367; 361/681

(58) Field of Classification Search ............ 16/312, 16/313, 315, 343, 351, 364, 367, 366, 250, 16/254, 302, 384; 361/680–683, 802, 803; 455/90, 556; 379/433.13

See application file for complete search history.

(56) References Cited

U.S. PATENT DOCUMENTS

| | | | | | |
|---|---|---|---|---|---|
| 5,978,211 | A | * | 11/1999 | Hong | 361/683 |
| 6,105,919 | A | * | 8/2000 | Min | 248/418 |
| 6,587,333 | B1 | * | 7/2003 | Tseng et al. | 361/681 |
| 6,694,570 | B1 | * | 2/2004 | Chen | 16/367 |
| 6,742,221 | B1 | * | 6/2004 | Lu et al. | 16/367 |
| 6,798,646 | B1 | * | 9/2004 | Hsu | 361/681 |
| 6,867,961 | B1 | * | 3/2005 | Choi | 361/681 |
| 6,883,206 | B1 | * | 4/2005 | Yang et al. | 16/337 |
| 2004/0012920 | A1 | * | 1/2004 | Tanimoto et al. | 361/683 |

* cited by examiner

*Primary Examiner*—Robert J. Sandy
*Assistant Examiner*—Andre' L. Jackson
(74) *Attorney, Agent, or Firm*—Rabin & Berdo, PC

(57) ABSTRACT

A pivotal device which is fixed onto a first body and a second body and enables the first body to make rotary and upward/downward movements against the second body is provided. The pivotal device includes a rotary spindle and a holder. The rotary spindle which has a sliding track disposed on the lateral side thereof is fixed onto the first body. The holder, which is fixed onto the second holder, has a second run-through hole for pivotally connecting the rotary spindle with at least a protrusion section which is inlaid into the sliding track being disposed at the second run-through hole. When the rotary spindle rotates, the protrusion section will slide along the sliding track enabling the rotary spindle to move closer to or farther from the holder.

20 Claims, 16 Drawing Sheets

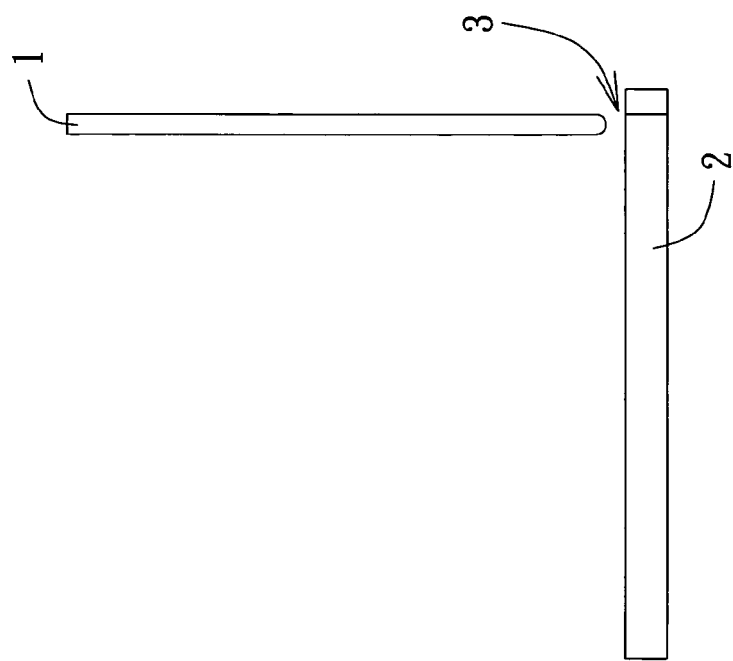
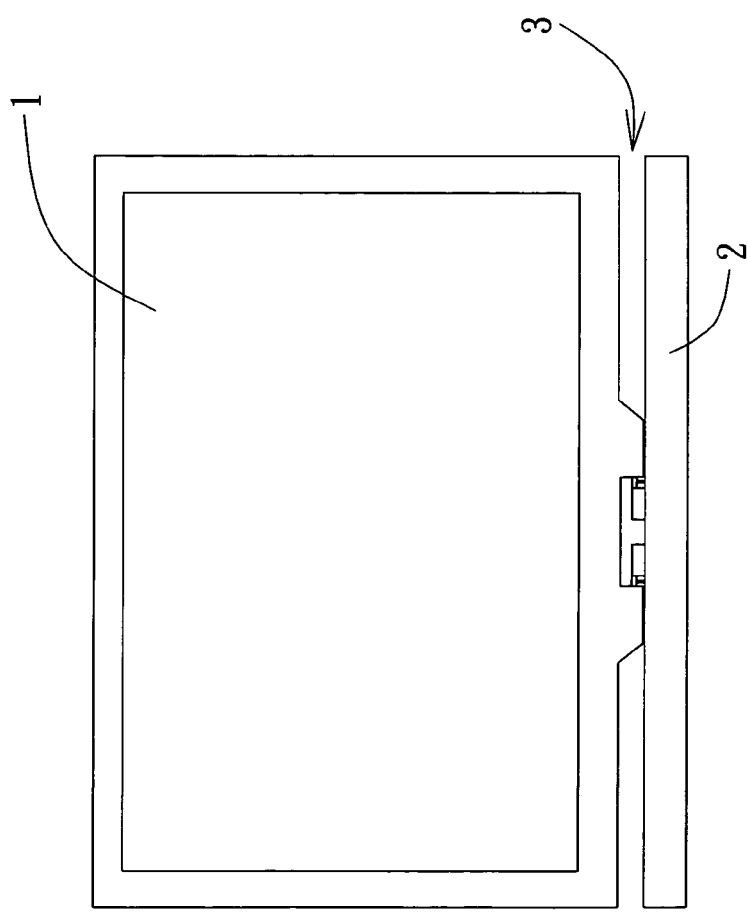
FIG. 1B(PRIOR ART)
FIG. 1A(PRIOR ART)

PIVOTAL DEVICE

This application claims the benefit of Taiwan application Serial No. 92132090, filed Nov. 14, 2003, the subject matter of which is incorporated herein by reference.

BACKGROUND OF THE INVENTION

1. Field of the Invention

The invention relates in general to a pivotal device, and more particularly to a pivotal device capable of making rotary and forward/backward movements.

2. Description of the Related Art

The press button or the keyboard installed on the surface of an electronic device is normally designed to be higher than the surface thereof to facilitate the user's operation. However, when a part of the electronic device is rotated against another part thereof, wear and tear on the contact surface between two adjacent devices pivotally connected by a pivotal device would occur. The prior art in solving the problem is to leave a big clearance between the two adjacent parts pivotally connected together. The above approach may have solved the problem at one hand, but at the other hand, the overall thickness of the electronic device is enlarged and the external aesthetics is deteriorated. Referring to FIG. 1A and FIG. 1B where a clearance 3 situated between a monitor section 1 and a mainframe section 2 can be clearly identified. The clearance 3 not only makes the size of the portable notebook larger but affects the external aesthetics thereof.

SUMMARY OF THE INVENTION

It is therefore an object of the invention to provide a pivotal device capable of making rotary and forward/backward movements. By means of a simple structural design, the pivotal device is able to move relatively forward or backward when rotates, preventing the occurrence of wear and tear on the surface of the two adjacent parts of the electronic device which are pivotally connected via the pivotal device, leaving only a small clearance between the two adjacent parts.

It is another object of the invention to provide a pivotal device to be fixed onto a first body, a connecting side of a monitor section for instance, and a second body, a connecting side of a mainframe section for instance, wherein the pivotal device, which includes a rotary spindle and a holder, enables the monitor section to move upwardly or downwardly when making rotary movement against the mainframe section. The rotary spindle is fixed onto the first connecting side; furthermore the rotary spindle has a sliding track disposed on the lateral side thereof. The holder, which is fixed onto the second holder, has a second run-through hole for pivotally connecting the rotary spindle with at least a protrusion section which is inlaid into the sliding track being disposed at the second run-through hole. When the rotary spindle rotates, the protrusion section will slide along the sliding track enabling the rotary spindle to make upward/downward movements.

It is another object of the invention to provide a pivotal device to be fixed onto a first body, a connecting side of a monitor section for instance, and a second body, a connecting side of a mainframe section for instance, wherein the pivotal device, which includes a rotary spindle and a holder, enables the monitor section to make upward/downward movements when making rotary movement against the mainframe section. The rotary spindle, which is fixed onto the first connecting side, has a protrusion section on the lateral side thereof. The holder, which is fixed onto the second holder, has a second run-through hole for pivotally connecting the rotary spindle. The sliding track which is coupled to the protrusion section is disposed in the second run-through hole. When the rotary spindle rotates, the protrusion section will slide along the sliding track, enabling the rotary spindle to make upward/downward movements.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 1A is a three-dimensional diagram of a conventional pivotal device installed in a portable computer;

FIG. 1B is a side view of the pivotal device illustrated in FIG. 1A;

DETAILED DESCRIPTION OF THE INVENTION

To facilitate the explanation of the device of the invention which may rotate and make upward/downward movements at the same time, the following preferred embodiments assuming the device is installed in a portable computer are disclosed. Nevertheless, in practical applications, the characteristics of the technology disclosed in the invention may also be applied in varied computer systems such as flat panel computers or flip-type electronic devices. The preferred embodiments disclosed below are based on the spirit of the invention.

PREFERRED EMBODIMENT ONE

Figure 2:
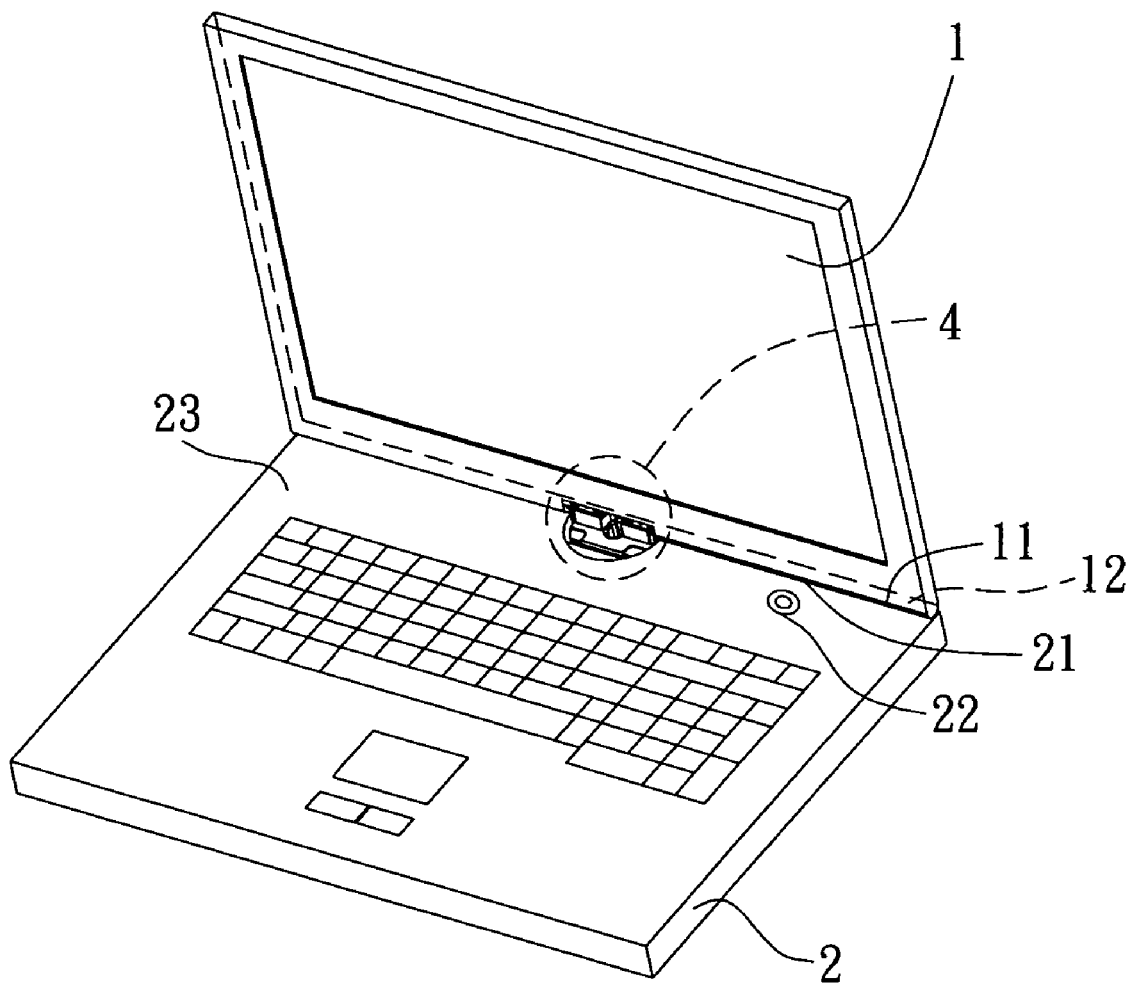
FIG. 2 is a three-dimensional diagram of a pivotal device installed in a portable computer according to preferred embodiment one of the invention.

Referring to FIG. 2, pivotal device 4 connects a first connecting side 11 of a monitor section 1 to a second connecting side 21 of a mainframe section 2 so that the monitor section 1 may rotate against or move towards/away from the mainframe section 2.

Figure 3A:
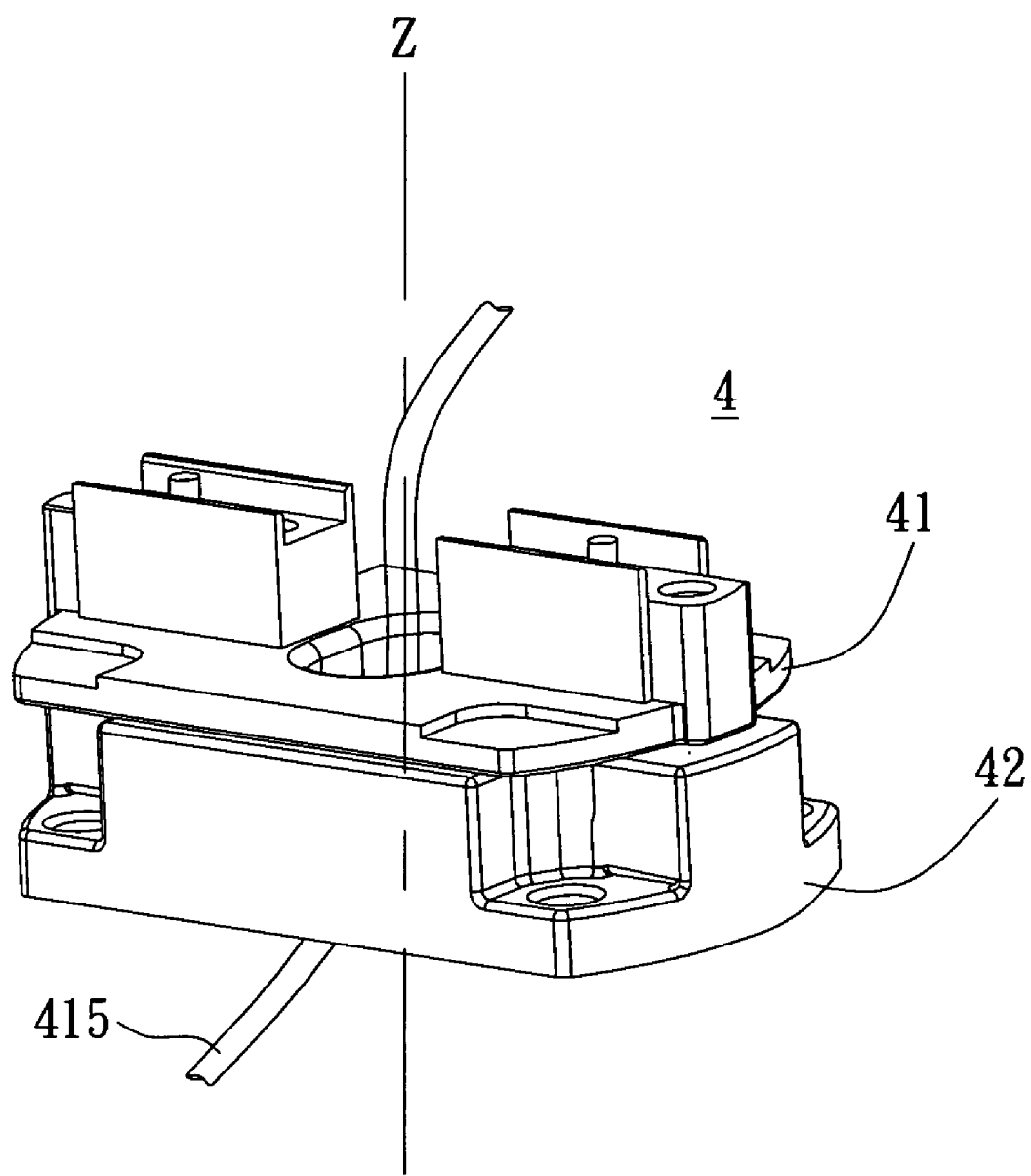
FIG. 3A is an enlargement of the pivotal device illustrated in FIG. 2.
Figure 3B:
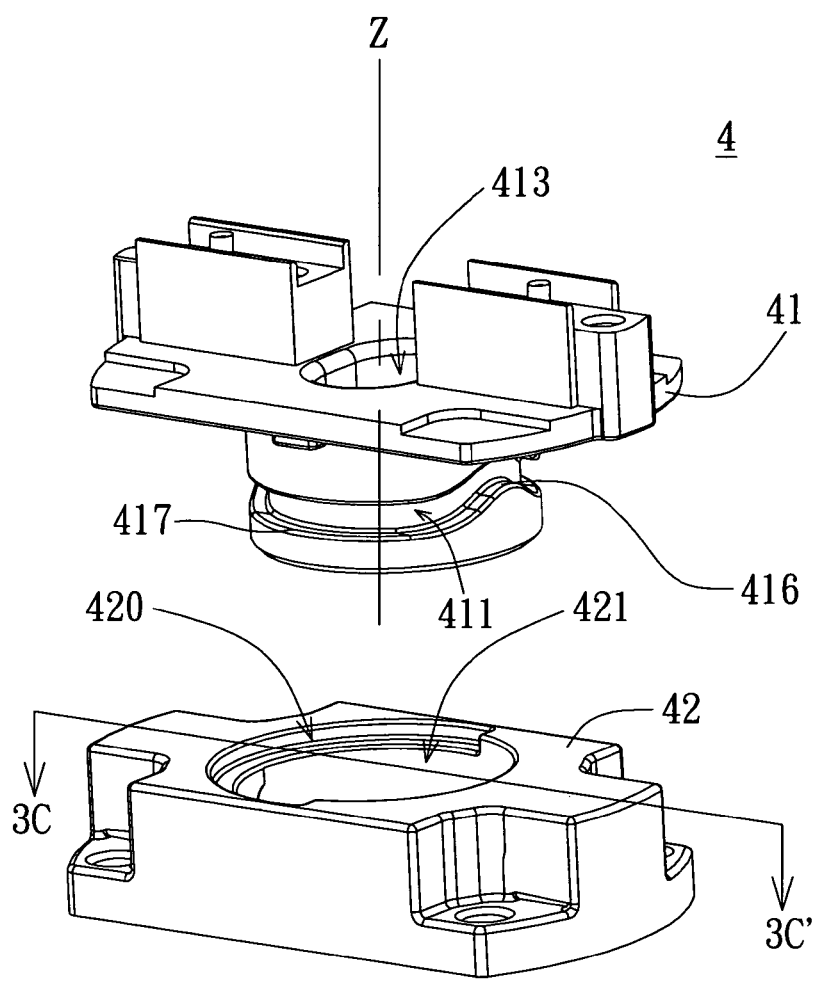
FIG. 3B is a decomposition of FIG. 3A.
Figure 3C:
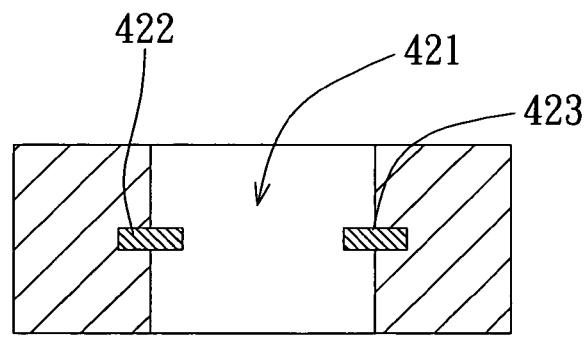
FIG. 3C is a sectional view of the holder in FIG. 3B along the line 3C–3C'.

Referring to FIG. 2, FIG. 3A, FIG. 3B and FIG. 3C at the same time. Pivotal device 4 includes a rotary spindle 41 and a holder 42. The rotary spindle 41 is fixed onto the first connecting side 11 of the monitor 1, wherein the lateral side of the rotary spindle 41 has a sliding track 411 while the axial direction Z of the rotary spindle 41 has a first run-through hole 413 which the electrical wire 415 connecting the monitor section 1 and the mainframe section 2 runs through. The holder 42, which has a second run-through hole 421 for pivotally connecting the rotary spindle 41, is fixed onto the second connecting side 21 of the mainframe section 2. As shown in FIG. 3C, the second run-through hole 421 has a first protrusion 422 and a second protrusion 423, wherein the first protrusion 422 and the second protrusion 423 are inlaid into the sliding track 411. When the rotary spindle rotates, the first protrusion 422 and the second protrusion 423 slide along the sliding track 411 bringing the rotary spindle 41 to move upwardly or downwardly. That is to say, the rotary device 4 according to the invention may move upwardly or downwardly when it rotates, lest friction between the first side 12 of the monitor section and the second side 23 of the mainframe section might occur. Moreover, the holder 42 is further equipped with a rotation positioning channel 420 which controls the rotation angle of the monitor section 1 to be less than 180° lest the electrical wire 415 might break if the rotation angle applied is too large.

Figure 4:
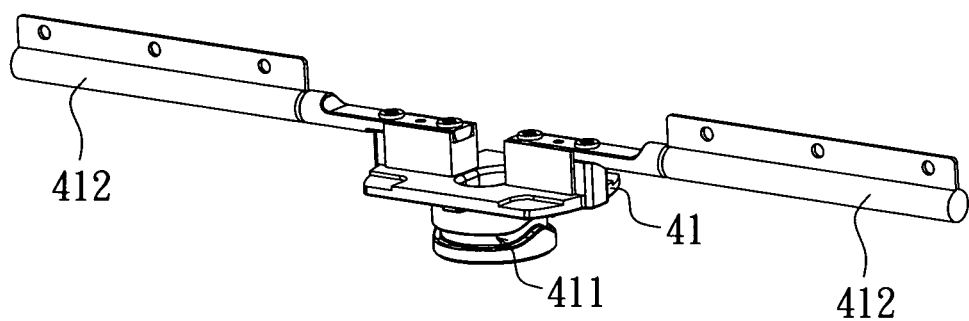
FIG. 4 is a three-dimensional diagram of the rotary spindle of a pivotal device further equipped with a hinge section according to preferred embodiment one of the invention.

Referring to FIG. 4, the rotary spindle 41 is further connected to two hinge sections 412 for connecting the monitor section 1, wherein the two hinge sections 412 enable the monitor section 1 to move towards or away from the mainframe section 2. The rotary spindle 41 with hinge sections 412 not only enables the monitor section 1 to make rotary or upward/downward movements against the mainframe section 2, but also enables the monitor 1 to be flipped open from or back to the mainframe section 2.

Figure 5:
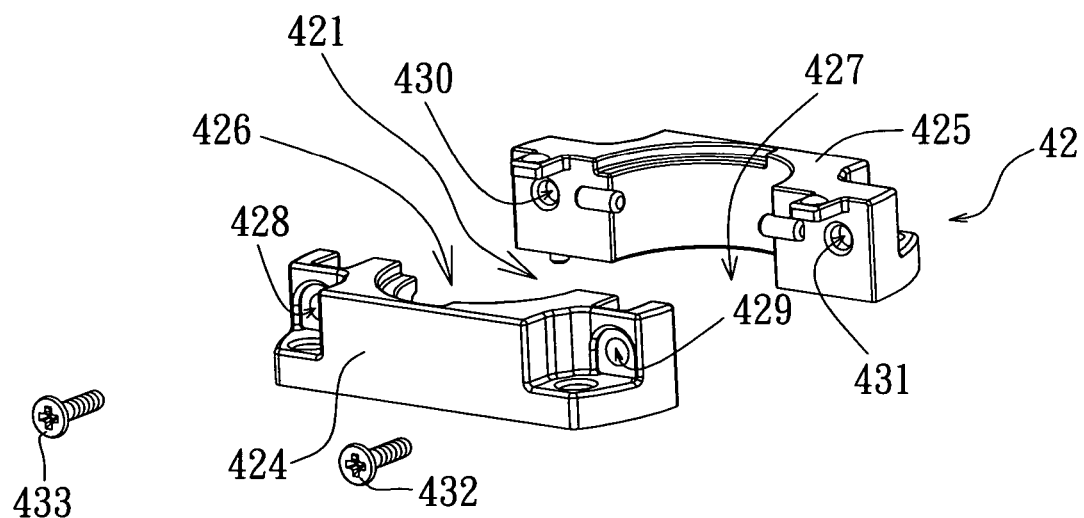
FIG. 5 is a decomposition of the holder of the pivotal device according to preferred embodiment one of the invention.

Referring to FIG. 5, the above holder 42 may comprise a first holder 424 and a second holder 425 which have a third run-through hole 426 and a fourth run-through hole 427 respectively, wherein the third run-through hole 426 and the fourth run-through hole 427 may be matched together to form a second run-through hole 421. With a screw 432 running through screw holes 429 and 431 and another screw 433 running through screw holes 428 and 430, the first holder 424 and the second holder 425 will be fastened. A holder like the holder 42 comprising a first holder 424 and a second holder 425 has advantages in terms of production and assembly.

Figure 9D:
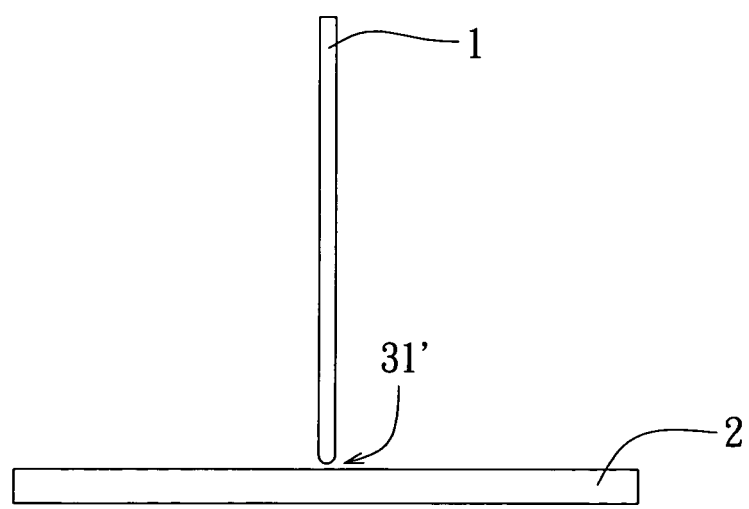
Figure 10A:
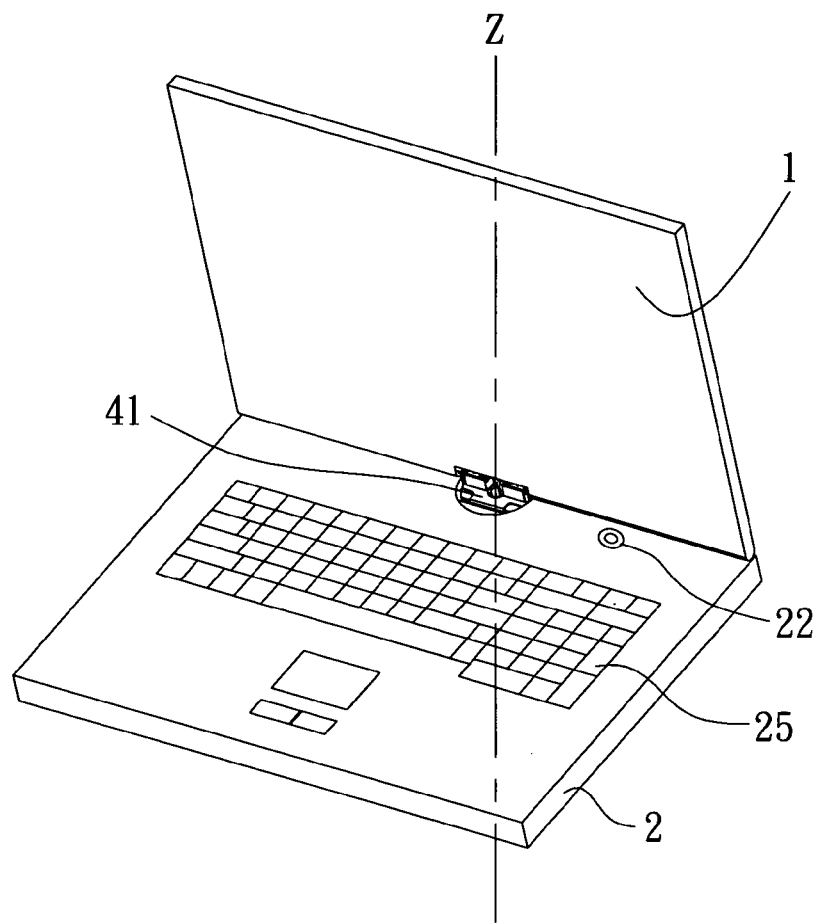
Figure 10B:
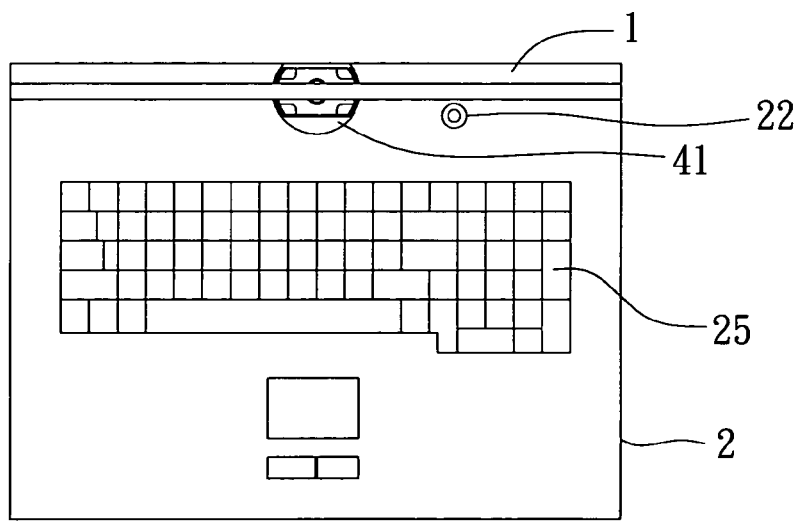
FIGS. 10B, 10C and 10D are respectively a top view, a front view and a side view of FIG. 10A.
Figure 10D:
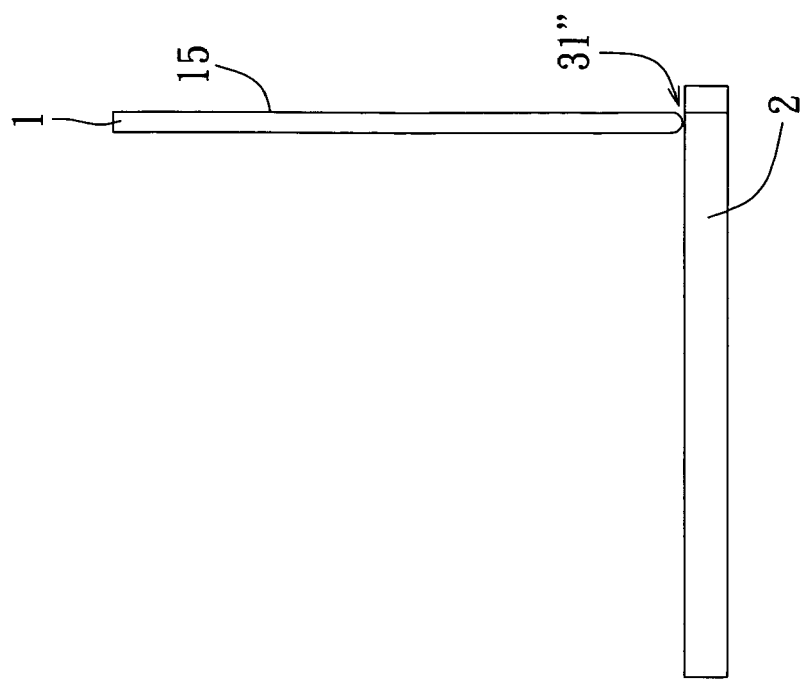
Figure 10C:
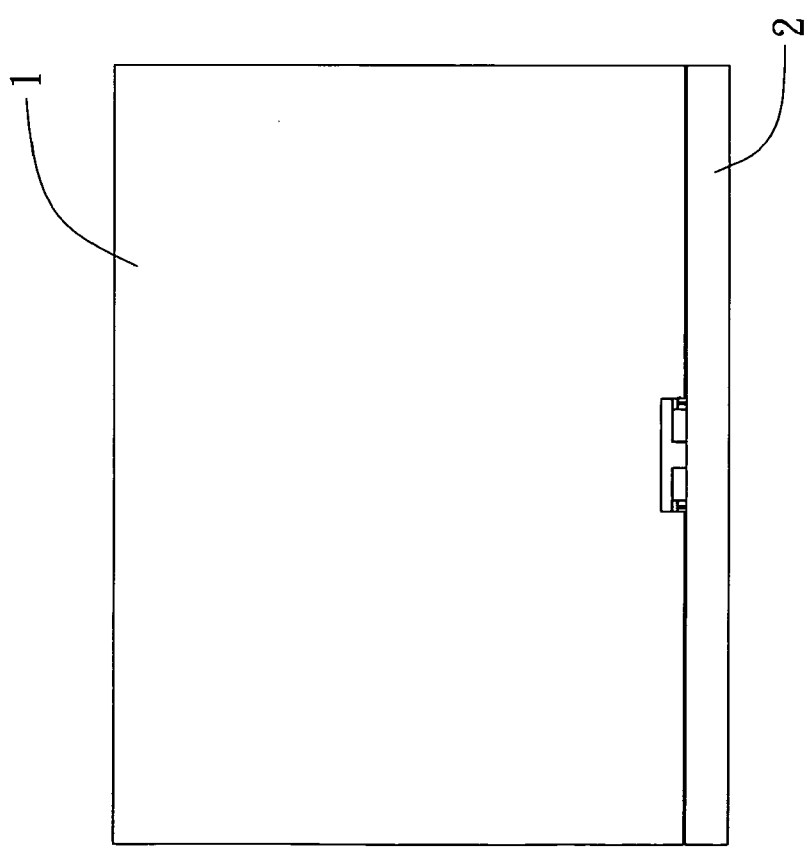

Referring to FIG. 3B and FIG. 3C, the shape of the sliding track 411 may be a rolling curve. When the monitor section 1 rotates, the rotary spindle 41 and the monitor section 1 move up and down along the rolling curve of the sliding track 411. That is to say, the sliding track 411 with different curves will have different upward/downward movements. Take the sliding track 411 illustrated in FIG. 3B for example, the sliding track 411 has a symmetric rolling curve comprising sliding track's two highest points 416 and sliding track's two lowest points 417. When the rotary spindle 41 rotates from 0° to 90°, the first protrusion 422 and the second protrusion 423 will move along the curve of the sliding track 411 so that the rotary spindle 41 will gradually ascend to the highest position against the holder 42 as shown in FIG. 9D. On the other hand, when the rotary spindle 41 rotates from 90° to 180°, the first protrusion 422 and the second protrusion 423 will move along the curve of the sliding track 411 so that the rotary spindle 41 will gradually descend to the lowest position against the holder as shown in FIG. 10D.

Figure 6:
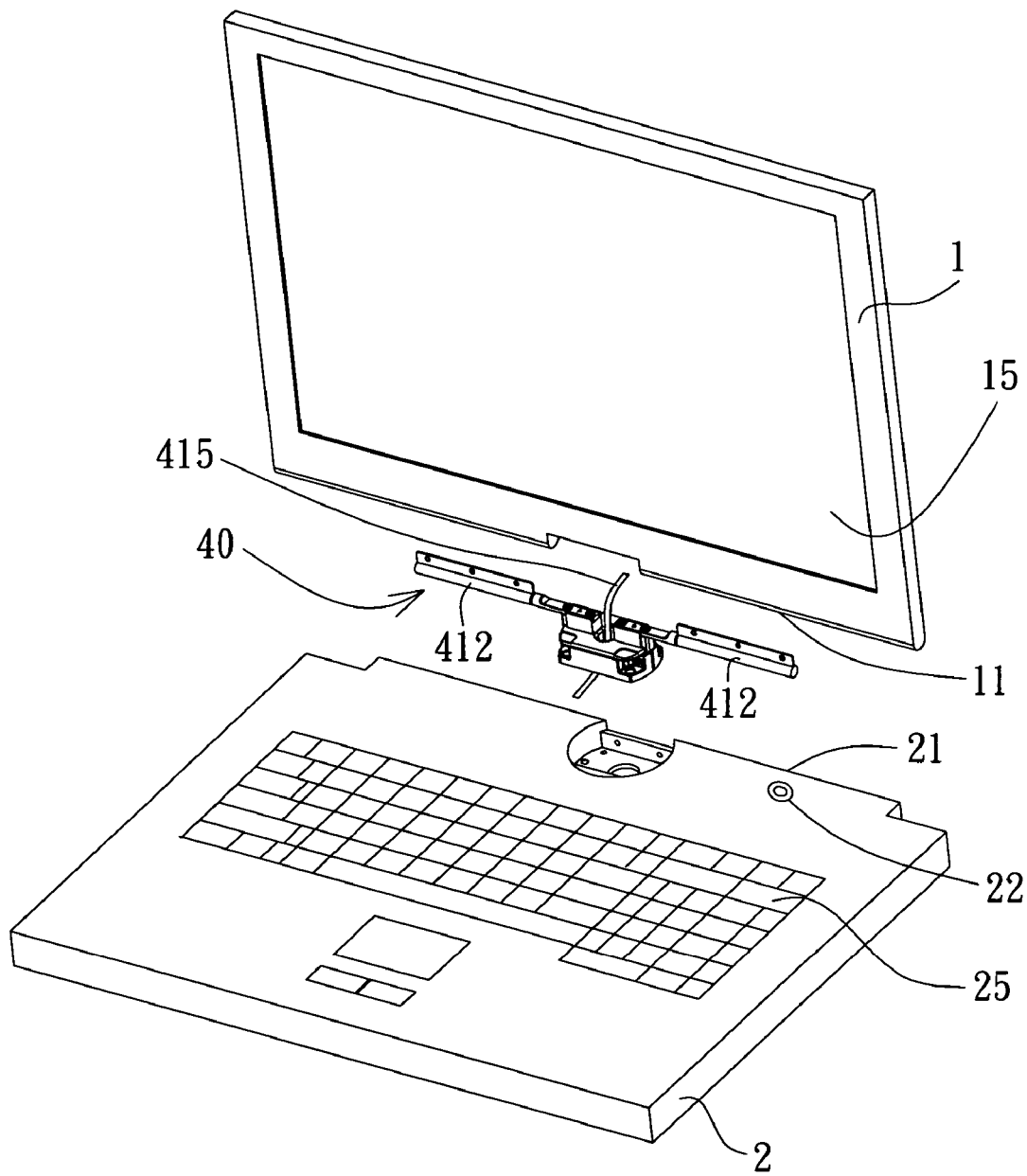
FIG. 6 is a three-dimensional diagram of a pivotal device with a hinge section according to preferred embodiment one of the invention and a portable computer.
Figure 7:
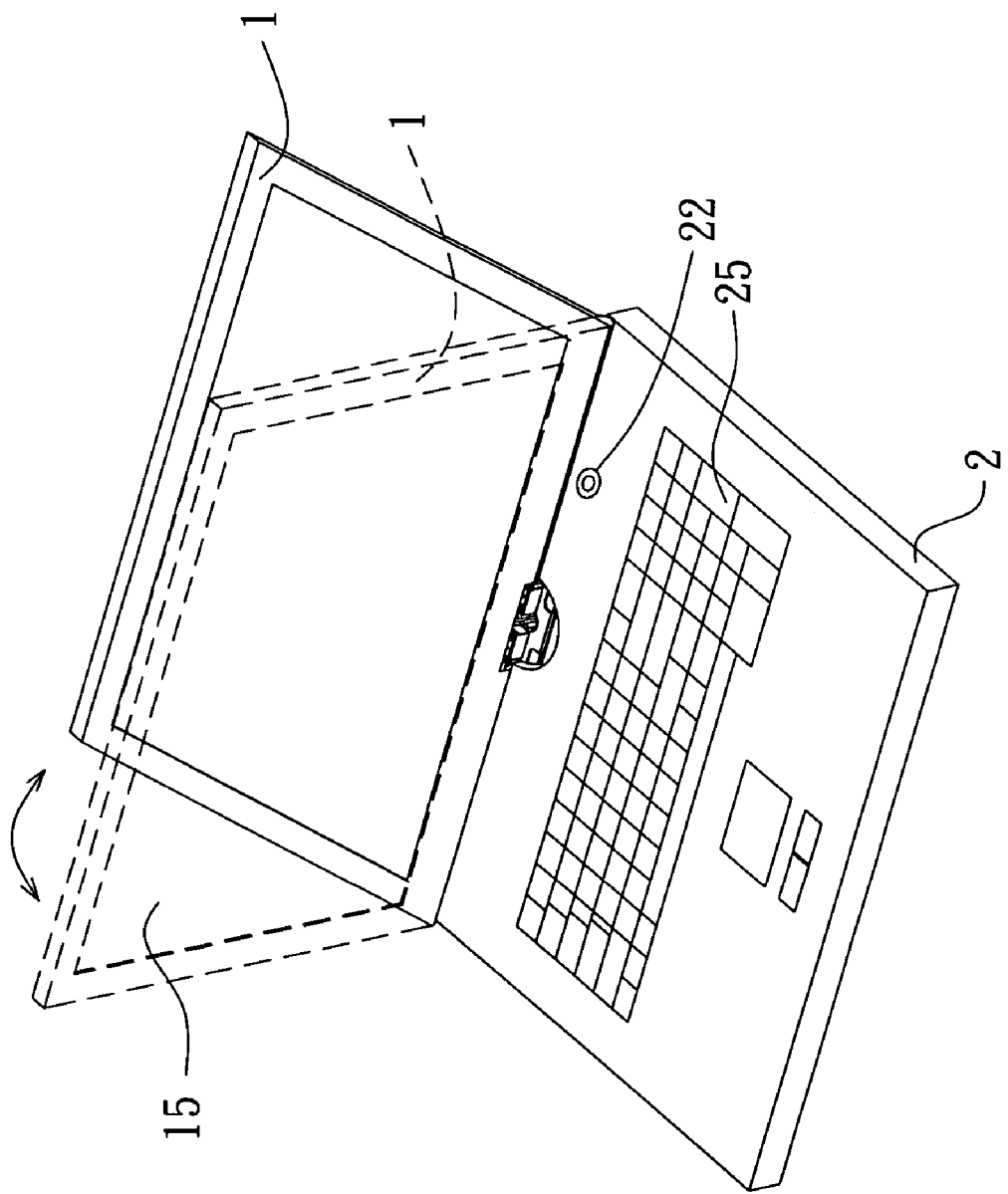
FIGS. 7, 8A, 9A, 10A and 11 are three-dimensional diagrams showing the operation of the invention.

Referring to FIG. 6, pivotal device 40 which has a hinge section 412 is fixed onto the first connecting side 11 of the monitor section 1 and the second connecting side 21 of the mainframe section 2. The pivotal device 40 not only enables the monitor section 1 to make rotary or upward/downward movements against the mainframe section 2, but also enables the monitor 1 to be flipped open from or back to the mainframe section 2.

Figure 8A:
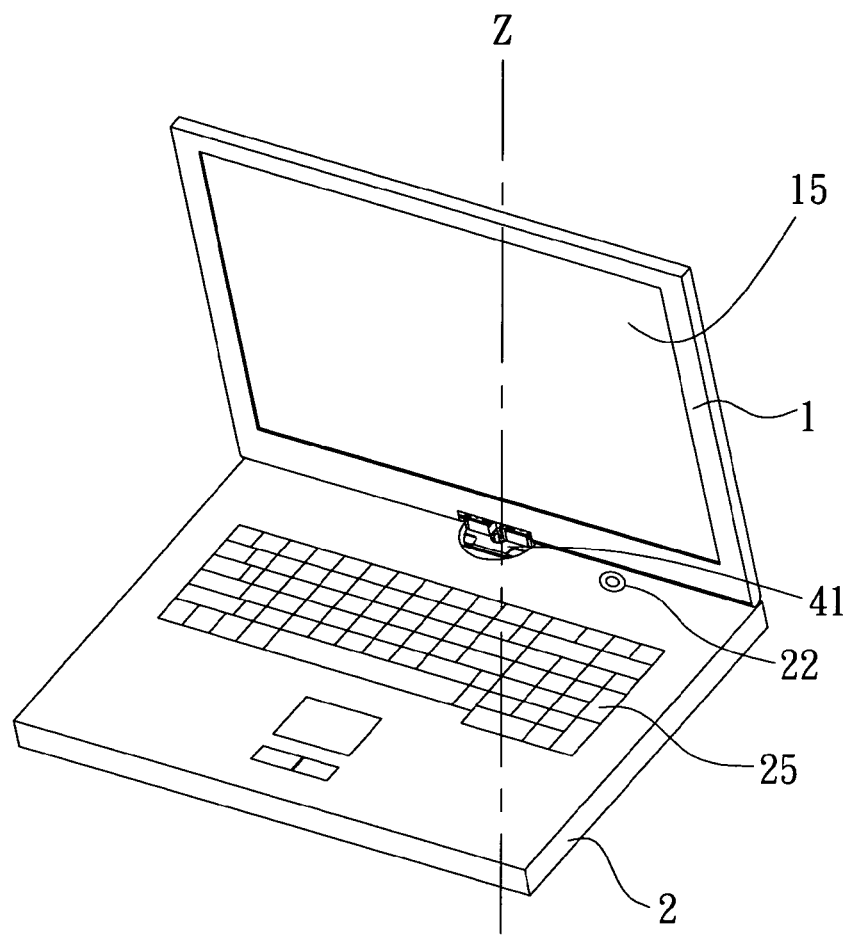
Figure 8B:
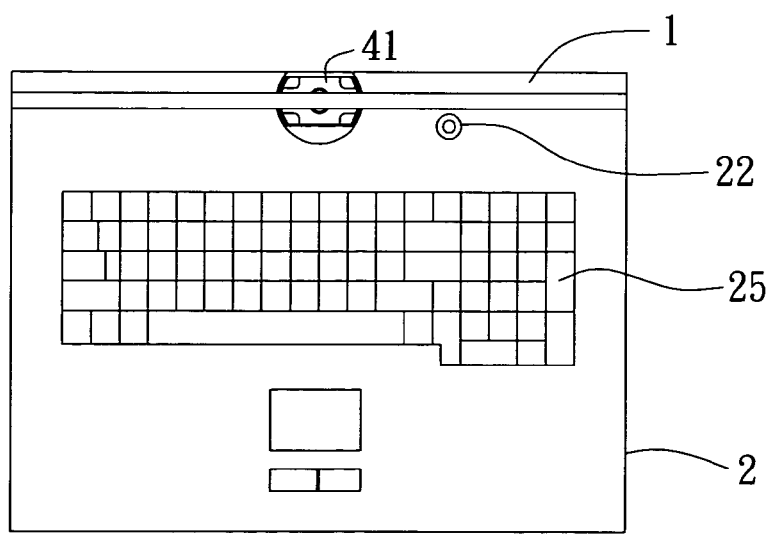
FIGS. 8B, 8C and 8D are respectively a top view, a front view and a side view of FIG. 8A.
Figure 8D:
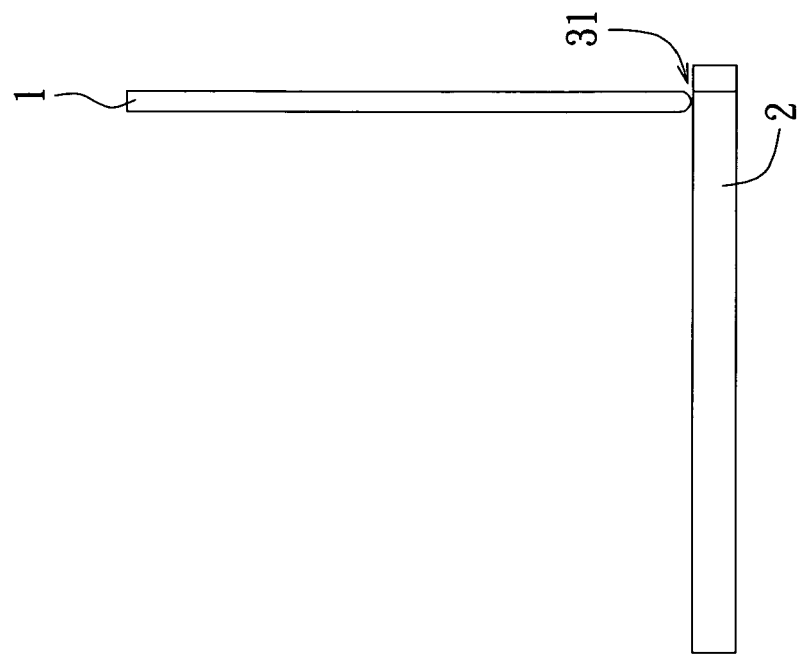
Figure 8C:
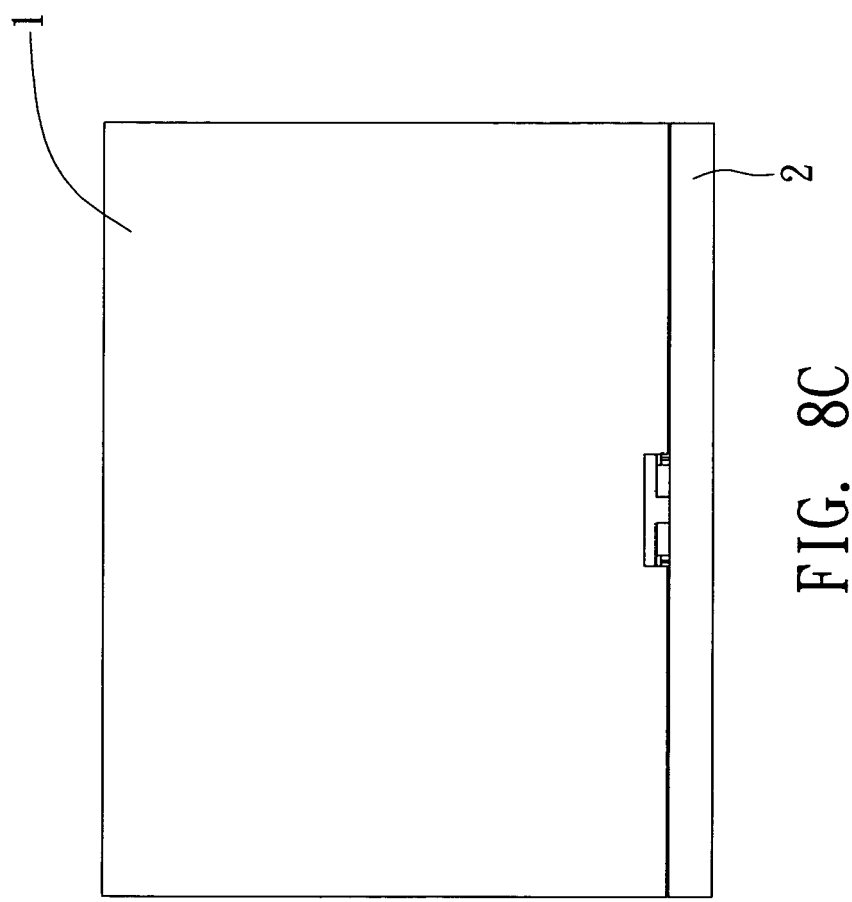

Referring to FIG. 8B when the monitor section 1 and the rotary spindle 41 are at the initial position. Also referring to FIG. 3B, when the first protrusion 422 and the second protrusion 423 are respectively disposed at the sliding track's two highest points 416, a clearance 31 between the monitor section 1 and the mainframe section 2 as shown in FIG. 8D will be created.

Figure 9A:
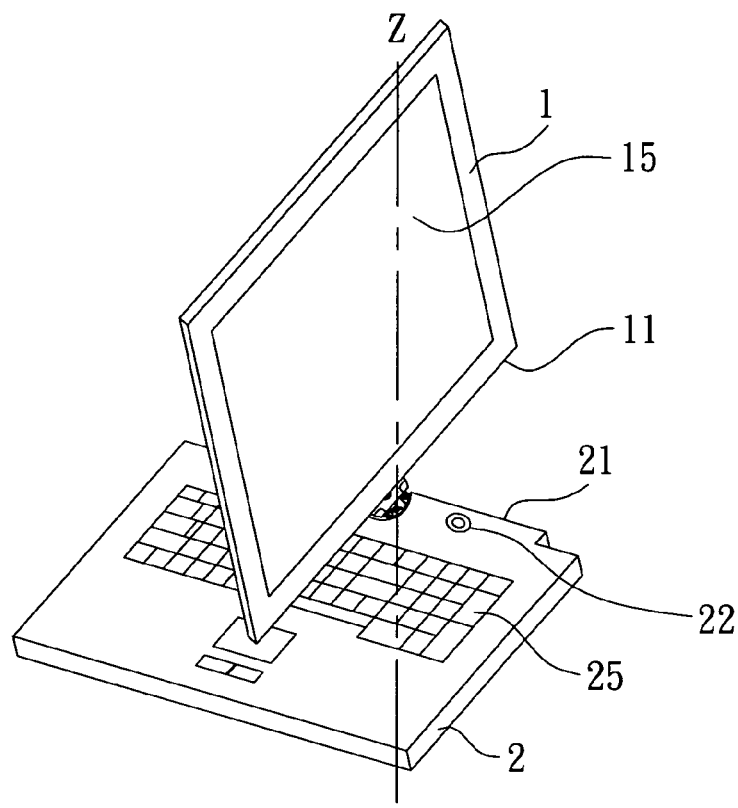
Figure 9B:
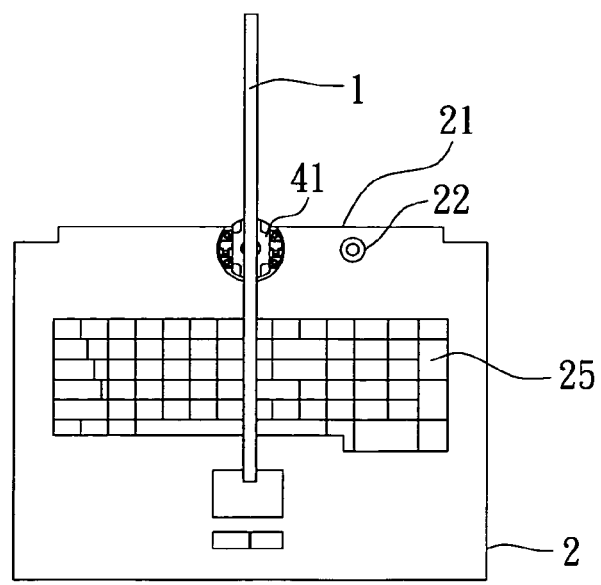
FIGS. 9B, 9C and 9D are respectively a top view, a front view and a side view of FIG. 9A.
Figure 9C:
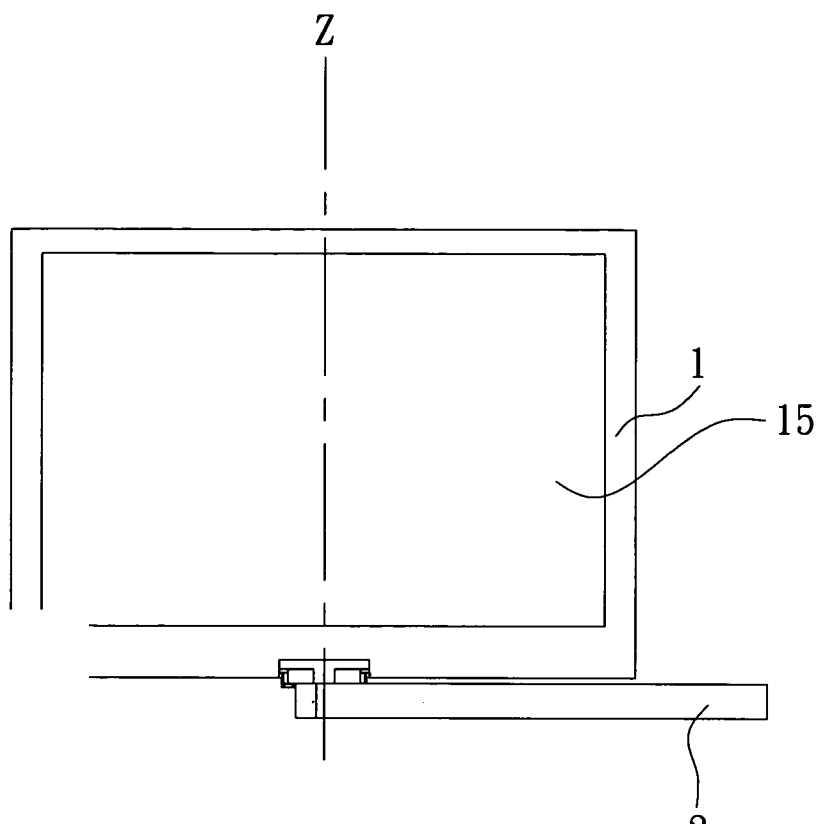
Figure 11:
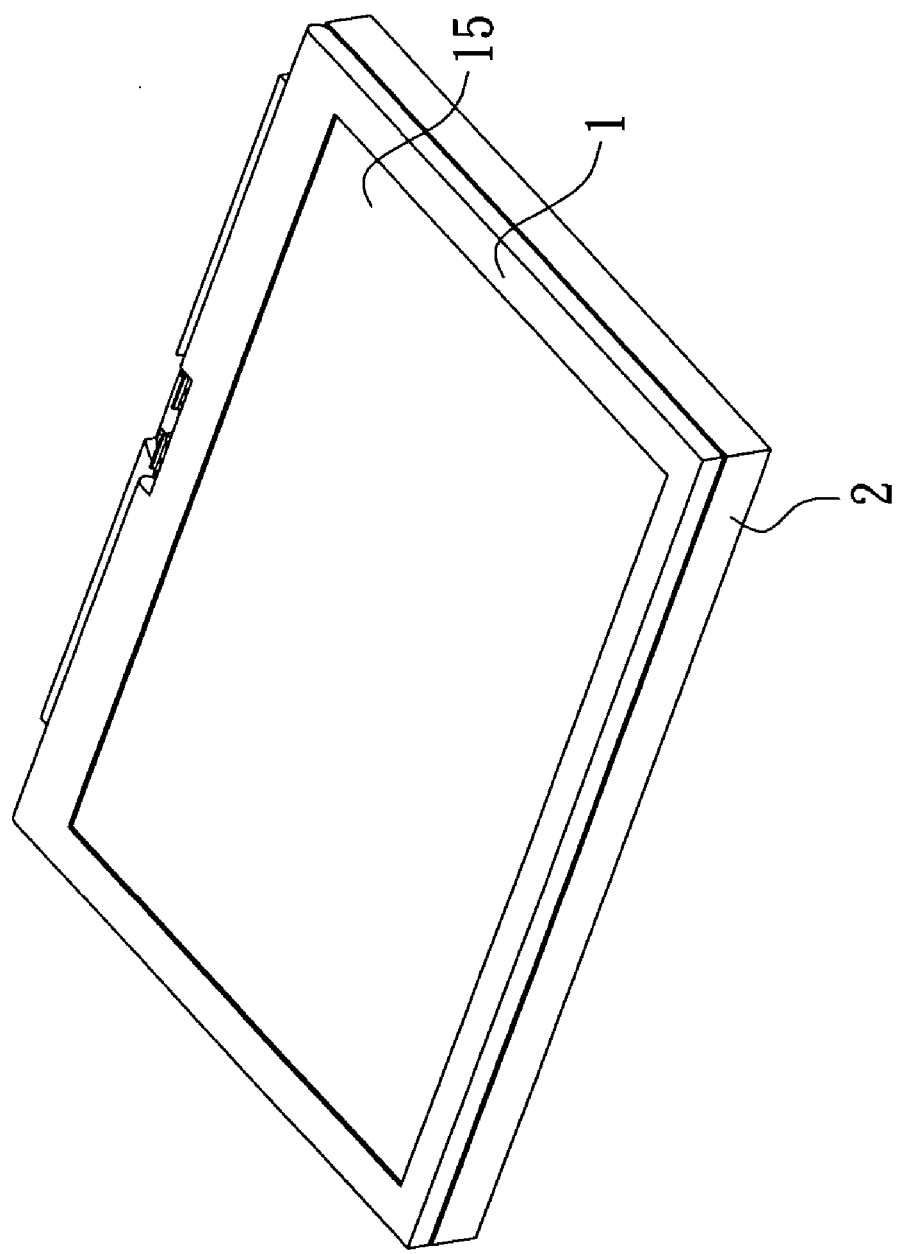

As shown in FIG. 9A, the monitor section 1 rotates 90° against its axis Z until the rotary spindle 41 is positioned at a second position (shown in FIG. 9B), a clearance 31' (shown in FIG. 9D) larger than clearance 31 (shown in FIG. 3B) between the monitor section 1 and the mainframe section 2 will be created. The clearance 31' is larger because the rotary spindle 41 and the monitor section 1 will make upward/downward movements when moving along the sliding track 411. When the rotary spindle 41 rotates 90°, the first protrusion 422 and the second protrusions 423 which are disposed in the holder 41 will move to the sliding track's lowest point 417 from the sliding track's highest point 416, causing the rotary spindle 41 to rise up a certain distance against the holder 42. The clearance 31' thus created is larger than clearance 31, therefore avoiding any friction between the monitor section 1 and the surface of the mainframe section 2 and the push-button 22 thereon. Referring to both FIG. 10A and FIG. 10D, when the rotary spindle 41 rotates 180° against its axis Z, i.e., the user is facing the rear side of a display panel 15, a clearance 31" thus created will be of the same scale with clearance 31, a clearance created when the rotary spindle 41 is positioned at the initial position as shown in FIG. 8D. This is because when the rotary spindle 41 rotates from 90° to 180°, the first protrusion 422 and the second protrusions 423 which are disposed in the holder 42 will slide back to the sliding track's highest point 416 from the sliding track's lowest point 417 and consequently the rotary spindle 41 descends along the holder 42. After the rotary spindle 41 has rotated 180°, the user will face the rear side of the display panel 15 instead of the front side thereof. After that, close the monitor section 1 to the mainframe section 2 via the hinge section 412 with the display panel 15 of the monitor section 1 facing upward. This portable computer now looks like an electronic book (shown in FIG. 11).

PREFERRED EMBODIMENT TWO

Figure 12:
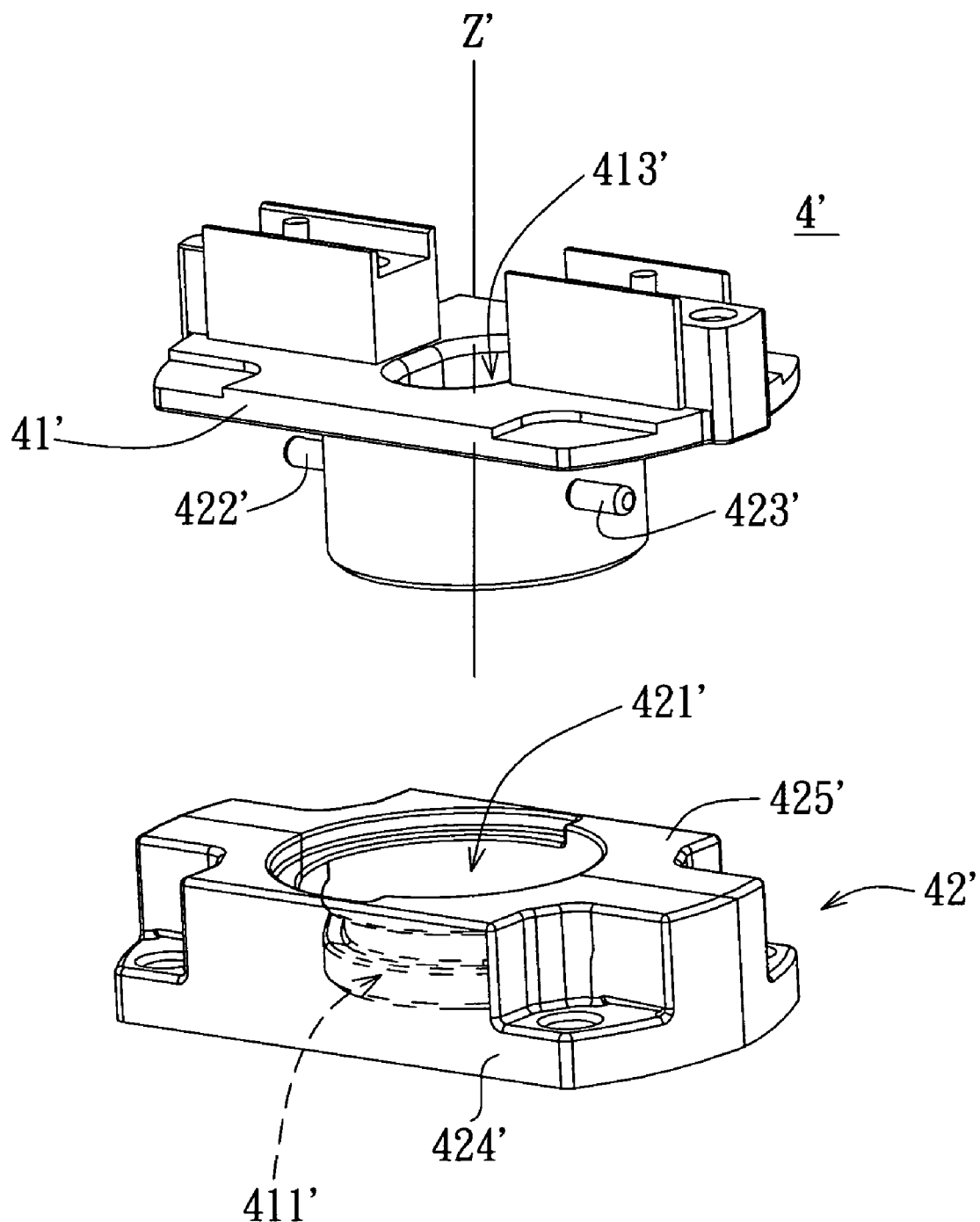
FIG. 12 is a decomposition of the pivotal device according to preferred embodiment two of the invention.

Referring to FIG. 12, a decomposition of pivotal device 4' according to preferred embodiment two of the invention. As shown in FIG. 12, the pivotal device 4' includes a rotary spindle 41', a first holder 424' and a second holder 425'. The first holder 424' and the second holder 425' are semi-circular and together form a circular holder 42'. Another difference between the present and the previous preferred embodiments is that the dispositions of the first protrusion 422', the second protrusion 423' and the sliding track 411' are different. Like what is shown in FIG. 6 of preferred embodiment one: the rotary spindle 41' is fixed onto the first connecting side 11 of the monitor section 1; the lateral side of the rotary spindle 41' has a first protrusion 422' and a second protrusion 423'; a first run-through hole 413' is disposed along the axial direction Z' of the rotary spindle 41' for an electrical wire 415 connecting the monitor section 1 and the mainframe section 2 to run through. The holder 42' which is fixed onto the second connection side of the mainframe section 2 has a second run-through hole 421' for pivotally connecting the rotary spindle 41'. The holder 42' has a sliding track 411' into which the first protrusion 422' and the second protrusion 423' are inlaid. When the rotary spindle 41' rotates, the first protrusion 422' and the second protrusion 423' will slide along the sliding track 411', bringing the rotary spindle 41' to move toward or away from the first holder 424' and the second holder 425'.

PREFERRED EMBODIMENT THREE

Figure 13A:
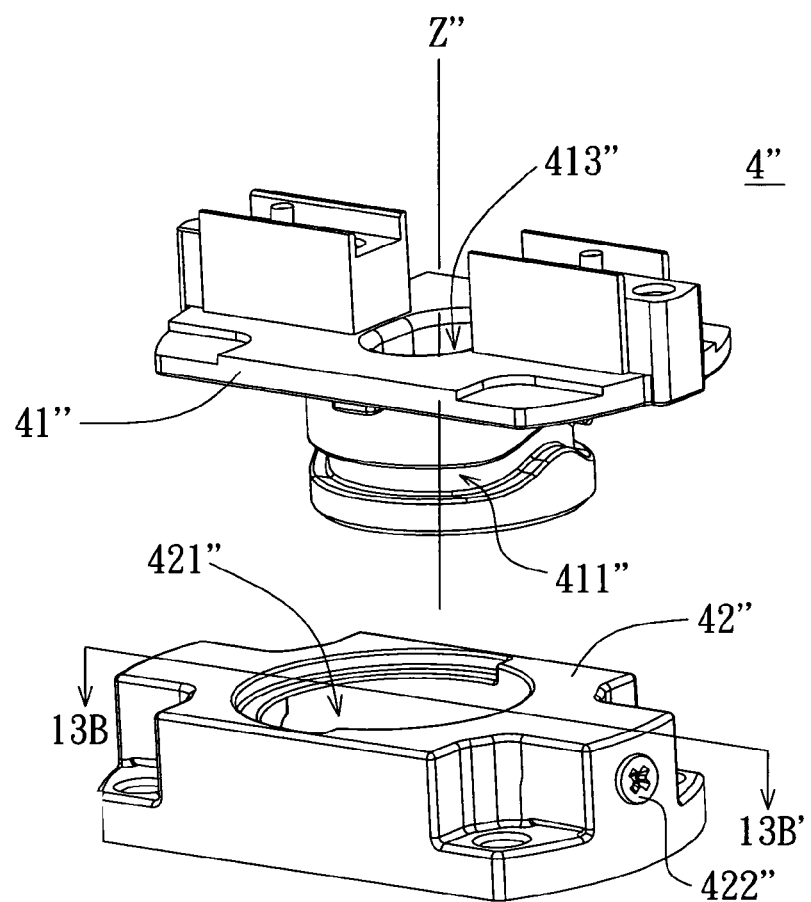
FIG. 13 is a decomposition of the pivotal device according to preferred embodiment three of the invention.
FIG. 13B is a sectional view of the holder in FIG. 13A along the line 13B–13B'.
Figure 13B:
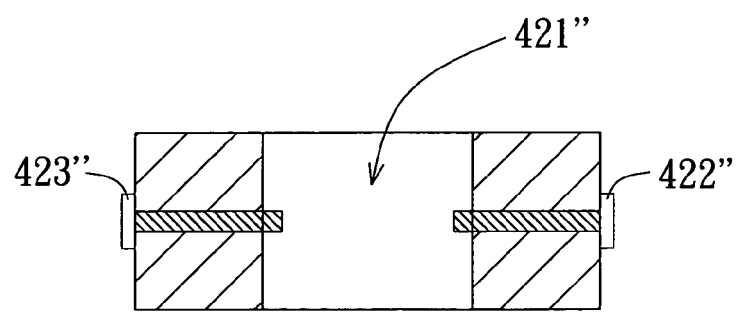

Referring to both FIG. 13A and FIG. 13B. FIG. 13A is a decomposition of pivotal device 4" according to preferred embodiment three of the invention. The pivotal device 4' includes a rotary spindle 41" and a first stand 42". The difference between the present preferred embodiment and preferred embodiment one is that preferred embodiment three uses the sharp ends of screws 422" and 423" to replace the first protrusion 422 and the second protrusion 423 shown in FIG. 3C of preferred embodiment one. Like what is shown in FIG. 6 of preferred embodiment one: the rotary spindle 41" is fixed onto the first connecting side 11 of the monitor section 1 (shown in FIG. 13A and FIG. 6); the lateral side of the rotary spindle 41" has a sliding track 411"; a first run-through hole 413" is disposed along the axial direction Z" of the rotary spindle 41" for an electrical wire 415 connecting the monitor section 1 and the mainframe section 2 to run through. The holder 42" which is fixed onto a second connecting side 21 of the mainframe section 2 has a second run-through hole 421" for pivotally connecting the rotary spindle 41". Referring to FIG. 13B, the sharp ends of screws 422" and 423", which are inlaid into the sliding track 411", will slide along the sliding track 411", bringing the rotary spindle 41" to move forward or back when the rotary spindle 41" rotates.

The pivotal device disclosed in above preferred embodiments according to the invention, by means of simple structural design which may be used to replace the familiar complicated pivotal device the monitor is enabled to make upward/downward movements against the mainframe section. Moreover, the pivotal device according to the invention may avoid the damage due to the friction between the two adjacent devices pivotally connected by the pivotal device. However, according to the spirit of the invention, the rolling curve of the sliding track may be designed to be non-symmetric to meet special needs. Despite two protrusions are disclosed in the above preferred embodiments, the number of protrusions are not to be limited thereto. In other words, the rolling curve of the sliding track may be designed to meet the user's needs; the pivotal device has at least one protrusion.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pivotal device for connecting a first body and a second body comprising:
    a rotary spindle which is fixed in the first body and having a sliding groove track disposed in a sidewall of the rotary spindle; and
    a holder which is fixed in the second body and having a second run-through hole for pivotally connecting with the rotary spindle, at least a protrusion section protruding stationarily into the second run-through hole, the protrusion section is inlaid into and movable along the sliding groove track, at least a part of the sliding groove track is not perpendicular to the axial direction of the rotary spindle, and the first body move away from the second body when the rotary spindle rotates against the holder.

2. The pivotal device according to claim 1, wherein the rotary spindle further comprises at least a hinge section for connecting the first body and enabling the first body to make pitching movements against the second body.

3. The pivotal device according to claim 1, wherein the protrusion section is a rib protruding from the second run-through hole.

4. The pivotal device according to claim 1, wherein the protrusion section is a screw protruding from the second run-through hole and being inlaid into the sliding groove track.

5. The pivotal device according to claim 1, wherein the axial direction of the rotary spindle further comprises at least a first run-through hole for electrical wires to pass through.

6. The pivotal device according to claim 1, wherein the holder further comprises a rotation positioning channel for restricting the maximum rotation angle of the rotary spindle.

7. The pivotal device according to claim 1, wherein the shape of the sliding groove track is a curve with at least a sliding groove track's highest point and a sliding groove track's lowest point.

8. The pivotal device according to claim 7, wherein the first body and the second body get closer or depart farther along with the curve of the sliding groove track when the first body rotates.

9. The pivotal device according to claim 1, wherein the holder further comprise a first holder and a second holder which respectively comprises a third run-through hole and a fourth run-through hole, and wherein the third run-through hole and the fourth run-through hole are matched together to form a second run-through hole.

10. The pivotal device according to claim 9, wherein the holder further comprises at least a fastening piece for connecting the first holder and the second holder together.

11. The pivotal device according to claim 10, wherein the fastening piece is a screw.

12. A pivotal device for connecting a first body and a second body, comprising:
    a rotary spindle which is fixed onto the first body and comprises at least a protrusion section protruding stationarily from the lateral side of the rotary spindle; and
    a holder which is fixed onto the second body and has a second run-through hole for pivotally connecting with the rotary spindle, wherein at least a sliding groove track is disposed in a sidewall of the holder and within the second run-through hole, the protrusion section is inlaid into and movable along the sliding groove track, wherein at least a part of the sliding groove track is not perpendicular to the axial direction of the rotary spindle allowing the first body to move away from the second body when the rotary spindle rotates against the holder, and wherein the holder further comprises a first holder and a second holder which respectively comprises a third run-through hole and a fourth run-through hole, and wherein the third run-through hole and the fourth run-through hole are matched together to form the second run-through hole.

13. The pivotal device according to claim 12, wherein the rotary spindle further comprises at least a hinge section for connecting the first body and enabling the first body to make pitching movements against the second body.

14. The pivotal device according to claim 12, wherein the protrusion section is a protrusion.

15. The pivotal device according to claim 12, wherein the axial direction of the rotary spindle further comprises at least a first run-through hole for electrical wires to pass through.

16. The pivotal device according to claim 12, wherein the holder further comprises a rotation positioning channel for restricting the maximum rotation angle of the rotary spindle.

17. The pivotal device according to claim 12, wherein the shape of the sliding groove track is a rolling curve comprising at least a sliding groove track's highest point and a sliding groove track's lowest point.

18. The pivotal device according to claim 17, wherein the first body and the second body get closer or depart farther along with the curve of the sliding groove track when the first body rotates.

19. The pivotal device according to claim 12, wherein the holder further comprises at least a fastening piece for connecting the first holder and the second holder together.

20. The pivotal device according to claim 19, wherein the fastening piece is a screw.

* * * * *